United States Patent [19]
Powers

[11] Patent Number: 5,936,531
[45] Date of Patent: Aug. 10, 1999

[54] ELECTRICAL FIRE SENSING AND PREVENTION/EXTINGUISHING SYSTEM

[76] Inventor: Frank A. Powers, 4280 Dawes La., Mobile, Ala. 36619

[21] Appl. No.: 09/036,656

[22] Filed: Mar. 6, 1998

[51] Int. Cl.$^6$ .................................................. G08B 17/10
[52] U.S. Cl. ......................... 340/628; 340/632; 340/517; 340/521; 340/577; 340/578; 169/60; 169/61; 169/65; 169/70
[58] Field of Search .................................... 340/628, 632, 340/517, 520, 521, 577, 578; 169/60, 61, 70, 65

[56] References Cited

U.S. PATENT DOCUMENTS

| | | | |
|---|---|---|---|
| 3,697,255 | 10/1972 | Oliver et al. ............................ | 340/577 |
| 3,754,602 | 8/1973 | Magdars ................................... | 169/60 |
| 3,813,551 | 5/1974 | Broadbent et al. .................. | 250/338.1 |
| 3,866,687 | 2/1975 | Baner ...................................... | 169/61 |
| 3,882,291 | 5/1975 | Chiboroski ........................... | 200/50.16 |
| 3,906,293 | 9/1975 | Meshbane et al. ..................... | 361/42 |
| 4,887,674 | 12/1989 | Galosky et al. .......................... | 169/61 |
| 4,893,680 | 1/1990 | Wittbrodt et al. ....................... | 169/60 |
| 4,984,637 | 1/1991 | Finnigan ................................. | 169/61 |
| 5,123,490 | 6/1992 | Jenne ...................................... | 169/61 |
| 5,361,847 | 11/1994 | Phelps .................................... | 169/58 |
| 5,468,811 | 11/1995 | Sehrle et al. .......................... | 340/522 |
| 5,613,562 | 3/1997 | Galbraith et al. ....................... | 169/12 |

*Primary Examiner*—Jeffery A. Hofsass
*Assistant Examiner*—Julie Lieu
*Attorney, Agent, or Firm*—Joseph N. Breaux

[57] ABSTRACT

An electrical fire sensing and fire prevention/extinguishing system which senses properties of electrical fires in cabinets having electrical circuits or circuit boards and detects sparks for detecting an electrical short in the electrical circuits or circuit boards. Upon detecting a spark, power to the electrical circuits or circuit boards is turned off to prevent a fire from developing within the cabinet. Furthermore, the electrical fire sensing and fire prevention/extinguishing system senses heat increases and smoke for activating a fire extinguishing device to extinguish a fire and turning off power to the electrical circuits or circuit boards.

14 Claims, 2 Drawing Sheets

ELECTRICAL FIRE SENSING AND PREVENTION/EXTINGUISHING SYSTEM

TECHNICAL FIELD

The present invention relates to fire sensing and extinguishing systems and, more particularly, to an electrical fire sensing and fire prevention/extinguishing system which senses properties of electrical fires in cabinets having electrical circuits or circuit boards and detects sparks for detecting an electrical short in such electrical circuits or circuit boards. Upon detecting a spark, power to such electrical circuits or circuit boards is turned off to prevent a fire from developing within the cabinet. Furthermore, the electrical fire sensing and fire prevention/extinguishing system senses heat increases and smoke for activating a fire extinguishing device to extinguish a fire and turning off power to the electrical circuits or circuit boards.

BACKGROUND OF THE INVENTION

Many offices are equipped with cabinets having electrical circuits or circuit boards for computerized systems, computer networks, telephone equipment, etc. However, on occasion these electrical circuits and circuit boards experience short circuiting in the electrical components which can cause an electrical fire. When a fire is experienced, the fire must be extinguished and the system or systems connected to the electrical circuits or circuit boards in the cabinet must be shut down for repairs. Therefore, operations are shut down and the fire damaged equipment must be replaced which is costly. Henceforth, it is desirable to provide these cabinets with short circuit detection to turn off the power to the electrical circuits or circuit boards to prevent the start of an electrical fire. Therefore, the down time for operations and the replacement cost of malfunctioning components can be significantly minimized since the electrical fire was prevented.

Furthermore, it is desirable to provide such cabinets with a heat sensor to sense increases in the temperature within the cabinets and a smoke detector to detect the presence of smoke to activate the fire extinguishing device.

Several devices have been patented which are aimed at fire extinguishing systems.

U.S. Pat. No. 5,613,562, to Galbraith et al., entitled "APPARATUS FOR SUPPRESSING A FIRE" disclose a fire suppression apparatus which is activated when a sensor detects the presence of a fire. The sensor detects the rise in temperature or change in the ionization potential of air due to the presence of smoke.

U.S. Pat. No. 5,361,847, to Phelps, entitled "FAILSAFE PHIAL-TYPE FIRE EXTINGUISHING SYSTEM" discloses a fail-safe phial-type fire extinguishing system which is intended to be activated when the environment in which a sensor is situated reaches a first predetermined condition and is activated as a fail-safe measure when the environment in which the phial is situated reaches a second predetermined condition.

U.S. Pat. No. 5,123,490, to Jenne, entitled "SELF-CONTAINED SMOKE ACTIVATED FIRE EXTINGUISHING FLOODING SYSTEM" discloses a self contained smoke actuated fire extinguishing flooding system having a smoke detector, a spring load plunger actuated valve, audio alarm and built-in test system which unitizes a blended halogenated fire extinguishing agent for use in enclosures for electronic, electrical and other equipment.

U.S. Pat. No. 4,893,680, to Wottbrodt et al., entitled "FIRE SUPPRESSION ACTIVATOR" disclose a fire extinguishing system which has a source of pressurized fluorocarbon suitable for extinguishing a fire in the interior of an armored vehicle. The fire extinguishing system is provided with a plurality of sensors for sensing a high temperature fire.

U.S. Pat. No. 4,984,637, to Finnigan, entitled "ELECTRONIC FIRE PROTECTION SYSTEM" discloses an electronic fire protection system which includes a central control circuit that operates a sprinkler or other extinguishing system in response to a sensed over temperature condition.

U.S. Pat. No. 4,887,674, to Galosky et al., entitled "CARTRIDGE OPERATED FIRE EXTINGUISHER" discloses a fire extinguisher apparatus that is operated by the force of a cartridge such as that used in a nail gun. The cartridge operated fire extinguisher has two detectors that are activated by two separate types of emissions that are characteristic of a fire. Both of these detectors must be simultaneously activated in order for the fire extinguisher apparatus to be operated by the cartridge. The fire extinguisher apparatus also is capable of shutting off electrical equipment such as stoves. The invention detects the level of ambient temperature and light or infrared radiation.

It can be readily seen that there exists the continuing need for an electrical fire sensing and fire prevention/extinguishing system which senses properties of electrical fires in cabinets having electrical circuits or circuit boards and detects sparks for detecting an electrical short in such electrical circuits or circuit boards wherein upon detecting a spark, power to such electrical circuits or circuit boards is turned off to prevent a fire from developing within the cabinet; and, wherein the electrical fire sensing and fire prevention/extinguishing system senses heat increases and smoke for activating a fire extinguishing device to extinguish a fire and turning off power to such electrical circuits or circuit boards.

As will be seen more fully below, the present invention is substantially different in structure, methodology and approach from that of the prior fire extinguishing systems.

SUMMARY OF THE INVENTION

The preferred embodiment of the electrical fire sensing and fire prevention/extinguishing system of the present invention solves the aforementioned problems in a straight forward and simple manner. What is provided is an electrical fire sensing and fire prevention/extinguishing system which senses properties of electrical fires in cabinets having electrical circuits or circuit boards and detects sparks for detecting an electrical short in such electrical circuits or circuit boards. Upon detecting a spark, power to such electrical circuits or circuit boards is turned off to prevent a fire from developing within the cabinet. Furthermore, the electrical fire sensing and fire prevention/extinguishing system senses heat increases and smoke for activating a fire extinguishing device to extinguish a fire and turning off power to such electrical circuits or circuit boards.

In view of the above, an object of the present invention is to provide an electrical fire sensing and fire prevention/extinguishing system which includes a spark sensor, a heat sensor, a smoke detector, a control logic circuit and a fire extinguishing device wherein when the spark sensor detects a spark, the control logic circuit shuts off the main power to the circuits in the cabinet. Furthermore, if the heat sensor detects an increase in temperature within the cabinet or the smoke detector detects the presence of smoke, the control logic circuit activates a valve of the fire extinguishing device and shuts off the main power to the circuits in the cabinet.

Another object of the present invention is to provide an electrical fire sensing and fire prevention/extinguishing system including a cabinet door switch which is opened when the door of the cabinet is opened to open the path from the spark senor to the control logic circuit to prevent the triggering of the control logic circuit to shut off the main power to the electrical circuits in the cabinet.

A further object of the present invention is to provide an electrical fire sensing and fire prevention/extinguishing system which is battery powered or powered by an independent source of power from the main power supply coupled to the electrical circuit in the cabinet.

It is a still further object of the present invention to provide an electrical fire sensing and fire prevention/extinguishing system which uses CO2 as a fire extinguishing agent.

It is a still further object of the present invention to provide an electrical fire sensing and fire prevention/extinguishing system including at least one alarm means for notifying designated personnel of a short circuit condition or a fire condition.

It is a still further object of the present invention to provide an electrical fire sensing and fire prevention/extinguishing system with a spark sensor which detects flashes or sparks of light and rapidly detects a flaming fire.

It is a still further object of the present invention to provide an electrical fire sensing and fire prevention/extinguishing system includes a sealed cabinet which does not permit ambient light from entering the cabinet when the cabinet door is closed.

In view of the above objects, it is a feature of the present invention to provide an electrical fire sensing and fire prevention/extinguishing system which is relatively simple structurally and which is simple to manufacture.

Another feature of the present invention is to provide an electrical fire sensing and fire prevention/extinguishing system which is simple to use.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 2:
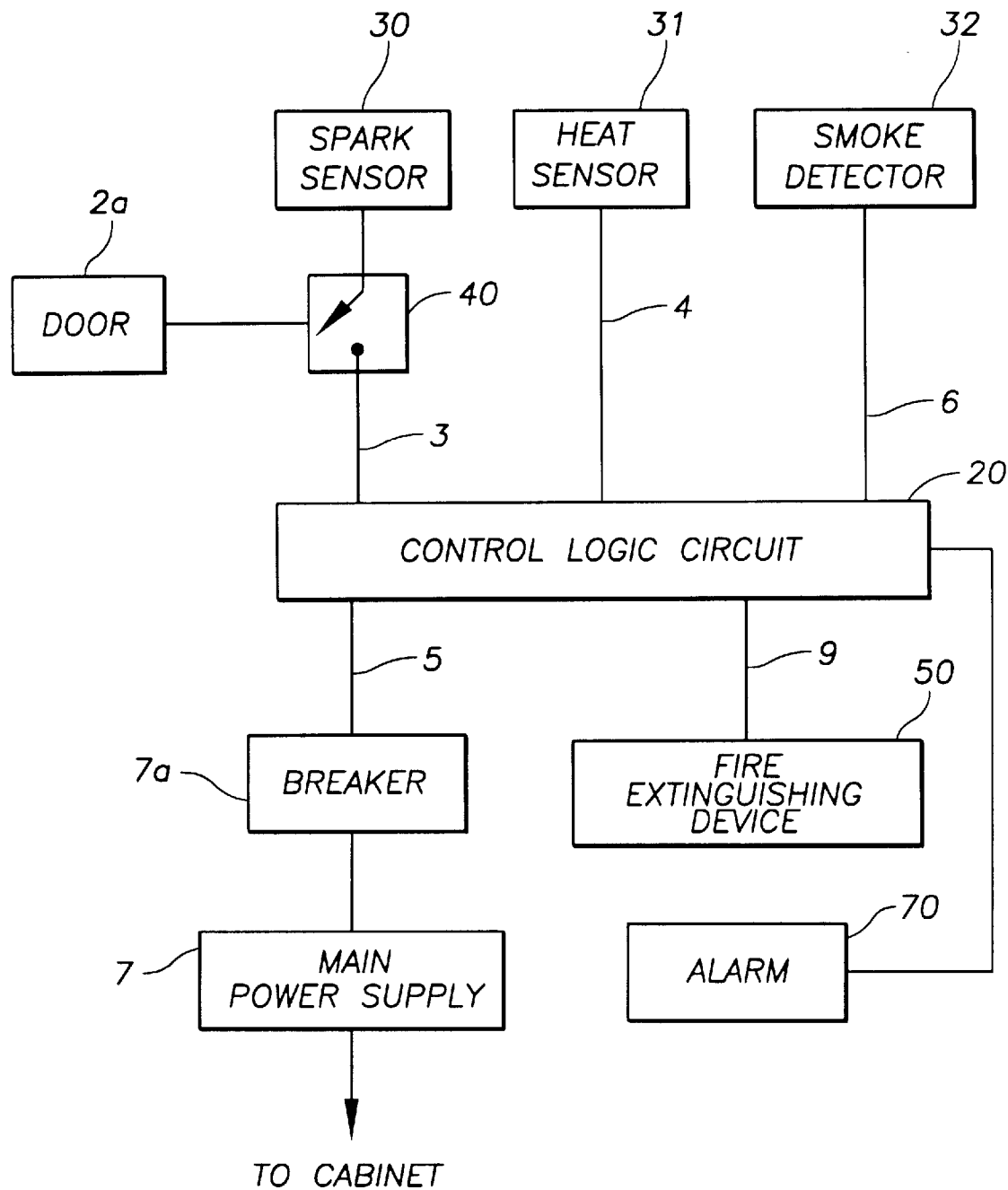
FIG. 2 illustrates a block diagram of the control circuit of the electrical fire sensing and fire prevention/extinguishing system of the present invention; and, FIG. 3 illustrates a front perspective view of the cabinet having the door partially removed.

Referring now to the drawings, and in particular FIG. 2, the electrical fire sensing and fire prevention/extinguishing system of the present invention is designated generally by the numeral 10. Electrical fire sensing and fire prevention/extinguishing system 10 is generally comprised of control logic circuit 20, spark sensor 30, heat sensor 31, smoke detector 32, cabinet door switch 40, fire extinguishing device 50 and at least one alarm 70. Electrical fire sensing and fire prevention/extinguishing system 10 of the present invention is coupled to a sealed cabinet 2. The sealing of cabinet 2 should prevent ambient light from entering cabinet 2 except when cabinet door 2a is opened.

Spark sensor 30 is positioned in cabinet 2 and serves to detect flashes of light such as sparks. In the preferred embodiment, spark sensor 30 comprises a very sensitive photoelectric cell for detecting flashes of light or sparks. Furthermore, spark sensor 30 would detect when a flaming fire is started within cabinet 2. Spark sensor 30 also provides rapid fire detection when a flaming fire is initially started.

Malfunctioning electrical circuits experiencing circuit shorting hereinafter referred to as "short circuit" typically exhibit flashes of light or sparks. Spark sensor 30 detects such flashes of light or sparks and delivers a signal on path 3 to control logic circuit 20 wherein in response to such detection control logic circuit 20 communicates a signal on path 5 to breaker 7a for cutting off main power supply 7 to electrical circuits 8 in cabinet 2. As can be appreciated, cutting off main power supply 7 to malfunctioning electrical circuits 8 enclosed in cabinet 2 serves to prevent a fire from developing within cabinet 2 due to such malfunction electrical circuits 8. Furthermore, when spark sensor 30 detects such flashes of light or sparks and delivers a signal to control logic circuit 20, control logic circuit 20 activates at least one alarm means 70.

Cabinet door 2a in the front of cabinet 2 is provided with cabinet door switch 40 which is normally in a closed position. When cabinet door 2a is opened cabinet door switch 40 is opened. Cabinet door switch 40 is positioned in path 3 between spark sensor 30 and control logic circuit 20. Thereby, when cabinet door switch 40 is opened, the path 3 to control logic circuit 20 is opened to prevent the triggering of control logic circuit 20 to turn off the main power supply 7 to electrical circuits 8. Henceforth, electrical circuits 8 and the sensors of electrical fire sensing and fire prevention/extinguishing system 10 housed within cabinet 2 can be inspected and serviced from time-to-time. More specifically, when cabinet door 2a is opened, spark sensor 30 would detect the ambient light outside of cabinet 2 and would erroneously trigger control logic circuit 20. Cabinet door switch 40 prevents the erroneously triggering of control logic circuit 20 when cabinet door 2a is opened by opening path 3. When cabinet door 2a is shut, cabinet door switch 40 is closed.

Furthermore, control logic circuit 20 may monitor the signal on path 3 to determine characteristics of the signal from spark sensor 30 to determine if a flaming fire is detected by spark sensor 30 prior to the detection by heat sensor 31 and smoke detector 32. Henceforth when the signal on path 3 indicates a flaming fire, control logic circuit 20 would shut off main power supply 7 to electrical circuits 8, activate fire extinguishing device 50 and activate at least one alarm 70.

Heat sensor 31 is positioned in cabinet 2 and detects the rise in temperature within cabinet 2. Heat sensor 31 is preset to normal temperature conditions within cabinet 2. In operation, heat sensor 31 detects the rise in the temperature within cabinet 2 above the preset normal temperature conditions. In response to detecting the presence of rising temperature, heat sensor 31 delivers a signal to control logic circuit 20 on path 4 wherein control logic circuit 20 communicates a signal on path 5 to breaker 7a for cutting off main power supply 7, activates fire extinguisher device 50 and activates at least one alarm 70.

Smoke detector 32 is positioned in cabinet 2 and detects a change in the ionization potential of air due to the presence of smoke. Electrical circuit malfunctions and/or fires can produce smoldering combustion (smoke) prior to an actual flaming fire. In response to detecting the presence of smoke, smoke detector 32 delivers a signal to control logic circuit 20 on path 6 wherein control logic circuit 20 communicates a signal on path 5 to breaker 7*a* for cutting off main power supply 7, activates fire extinguisher device 50 and activates at least one alarm 70.

As can be appreciated, cutting off main power supply 7 to malfunctioning electrical circuits 8 enclosed in cabinet 2 in response to heat sensor 31 or smoke detector 32 serves to minimize the spread of a fire or to prevent a flaming fire from developing within cabinet 2 due to such malfunctioning electrical circuits 8. Control logic circuit 20 activates fire extinguishing device 50 by activating valve 51 of fire extinguishing device 50 via path 9. In the preferred embodiment, control logic circuit 20, spark sensor 30 heat sensor 31, and smoke detector 32 are battery operated or powered by an independent source of power separate from main power supply 7.

Figure 1:
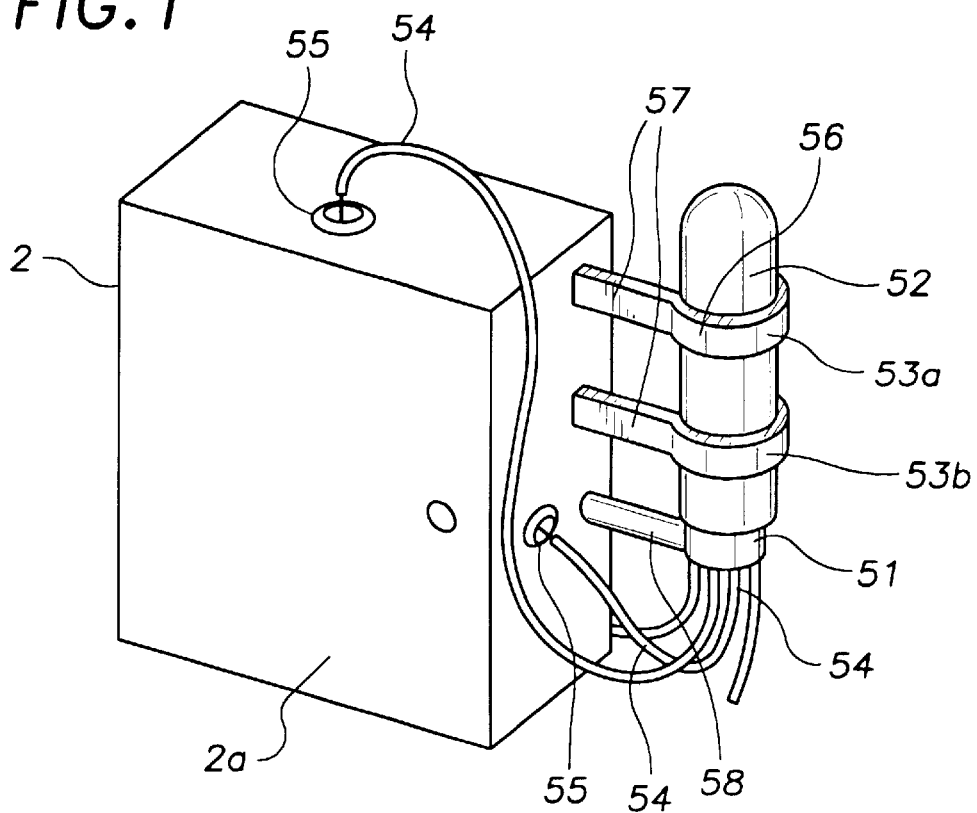
FIG. 1 illustrates a front perspective view of the fire extinguishing device of the preferred embodiment of the electrical fire sensing and fire prevention/extinguishing system of the present invention coupled to a cabinet.
Figure 3:
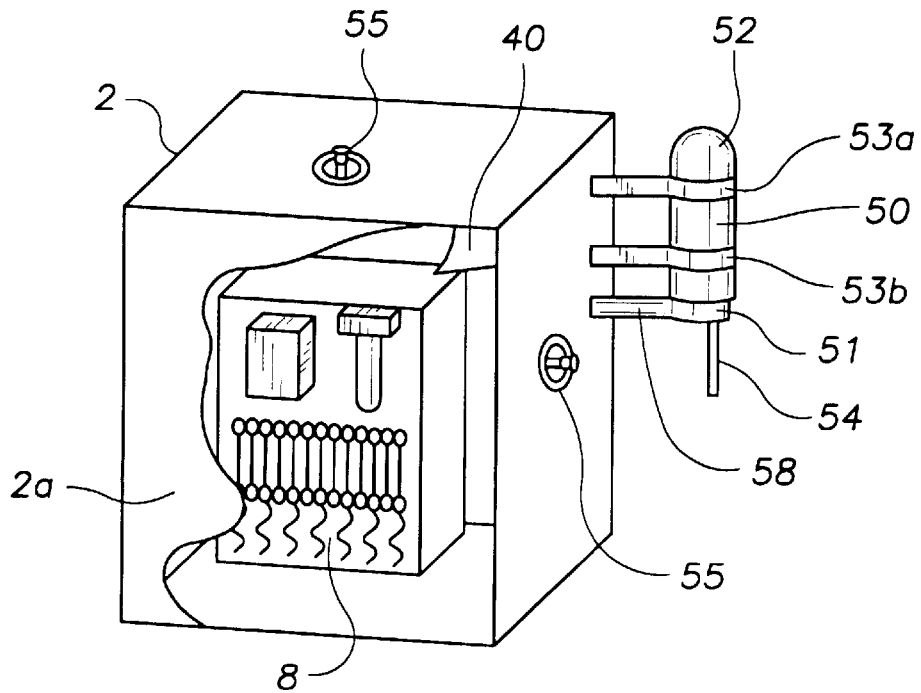

Referring now to FIGS. 1 and 3, fire extinguishing device 50 comprises valve 51, fire extinguishing agent storage tank 52, first and second storage tank attachment members 53*a* and 53*b,* at least one agent distribution hose 54 and at least one inlet port 55. In the preferred embodiment, the fire extinguishing agent stored in fire extinguishing agent storage tank 52 is CO2.

Fire extinguishing agent storage tank 52 comprises a cylindrical enclosure for storing therein CO2. Fire extinguishing agent storage tank 52 is coupled to the side of cabinet 2 via first and second storage tank attachment members 53*a* and 53*b*. First and second storage tank attachment members 53*a* and 53*b* each comprise a circular member 56 fixedly coupled circumferentially around first extinguishing agent storage tank 52. Each circular member 56 has rigidly coupled thereto support bar member 57 for securing fire extinguishing agent storage tank 52 to the side of cabinet 2. As best seen in FIG. 1, support bar member 57 of first and second storage tank attachment members 53*a* and 53*b* supports fire extinguishing agent storage tank 52 a predetermined distance from the side of cabinet 2.

The bottom side of fire extinguishing agent storage tank 52 has coupled thereto valve 51. Path 9 is housed in conduit 58 to valve 51 wherein conduit 58 projects from the side of cabinet 2 to valve 51. Valve 51 may be a solenoid activated valve or other type of suitable valve which can be controlled to permit the flow of fire extinguishing agent in response to the signal on path 9. When valve 51 is opened fire extinguishing agent is expelled under pressure through at least one agent distribution hose 54 coupled to a respective inlet port 55. In the preferred embodiment, there are a plurality of agent distribution hoses 54 coupled to a respective inlet port 55 of a plurality of spaced inlet ports. As shown, each side and top wall of cabinet 2 has coupled thereto an inlet port 55. Thereby, the fire extinguishing agent flowing through each agent distribution hose 54 is distributed in different directions and regions in cabinet 2.

At least one alarm 70 preferably comprises an indicator which may be remotely located for notifying operators that a short circuit has occurred when spark sensor 30 detects a flash or spark in cabinet 2. Therefore, the operators can readily inspect the electrical circuits 8 in cabinet 2 for malfunctioning electrical circuits. Additionally, a separate alarm may be provided indicate a fire has occurred.

It is noted that the embodiment of the electrical fire sensing and fire prevention/extinguishing system described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An electrical fire sensing and fire prevention/extinguishing system comprising:

a sealed cabinet, having a cabinet door, for enclosing electrical circuits wherein said electrical circuits have coupled thereto a power supply, said sealed cabinet preventing ambient light from entering said sealed cabinet except when said cabinet door is open;

a spark sensor for detecting flashes or sparks of light within said sealed cabinet, said spark sensor being a photoelectric cell;

a heat sensor for detecting a rise in temperature in said sealed cabinet;

a smoke detector for detecting smoke in said sealed cabinet;

a fire extinguisher device for storing a fire extinguishing agent;

a control logic circuit having coupled thereto said spark sensor, said heat sensor, said smoke detector, said fire extinguisher device and said power supply wherein in response to said spark sensor detecting a flash or spark of light in said sealed cabinet, said control logic circuit shuts off said power supply and when said heat sensor or said smoke detector detects a rise in temperature or the presence of smoke, respectively, said control logic circuit shuts off said power supply and activates said fire extinguishing device, and a cabinet door switch coupled between the spark sensor and the control logic circuit wherein when said cabinet door is opened said cabinet door switch is opened to open a path from the spark sensor to the control logic circuit.

2. The system of claim 1, further comprising at least one alarm wherein when said control logic circuit shuts off said power supply, said at least one alarm is activated.

3. The system of claim 1, wherein said spark sensor further detects a flaming fire; and wherein when said flaming fire is detected said control logic shuts off said power supply and activates said fire extinguishing device.

4. The system of claim 1, wherein said fire extinguishing agent is carbon dioxide (CO2).

5. The system of claim 1, wherein said fire extinguishing device comprises:

a cylindrical enclosure for storing therein said fire extinguishing agent;

first and second storage tank attachment members coupled to a side of said cabinet wherein said first and second storage tank attachment members each comprise a circular member fixedly coupled circumferentially around said cylindrical enclosure and a support bar member coupled to said circular member for securing said cylindrical enclosure to the side of said sealed cabinet;

a valve coupled to a bottom side of said cylindrical enclosure and to a path from said control logic circuit;

at least one agent distribution hose coupled to said valve; and, at least one inlet port coupled to said cabinet and to one end of said agent distribution hose.

6. An electrical fire sensing and fire prevention/extinguishing system comprising:

a sealed cabinet, having a cabinet door, for enclosing electrical circuits wherein said electrical circuits have coupled thereto a power supply, said sealed cabinet preventing ambient light from entering said sealed cabinet except when said cabinet door is open;

a spark sensor for detecting flashes or sparks of light within said sealed cabinet, said spark sensor being a photoelectric cell;

a heat sensor for detecting a rise in temperature in said sealed cabinet;

a smoke detector for detecting smoke in said sealed cabinet;

a fire extinguisher device for storing a fire extinguishing agent;

a control logic circuit having coupled thereto said spark sensor, said heat sensor, said smoke detector, said fire extinguisher device and said power supply wherein in response to said spark sensor detecting a flash or spark of light in said sealed cabinet, said control logic circuit shuts off said power supply and when said heat sensor or said smoke detector detects a rise in temperature or the presence of smoke, respectively said control logic circuit shuts off said power supply and activates said fire extinguishing device; and, a cabinet door switch coupled between said spark sensor and said control logic circuit wherein when said cabinet door is opened said cabinet door switch is opened to open a path from said spark sensor to said control logic circuit.

7. The system of claim 6, further comprising at least one alarm wherein when said control logic circuit shuts off said power supply, said at least one alarm is activated.

8. The system of claim 6, wherein said spark sensor further detects a flaming fire; and wherein when said flaming fire is detected said control logic shuts off said power supply and activates said fire extinguishing device.

9. The system of claim 6, wherein said fire extinguishing agent is CO2.

10. The system of claim 6, wherein said fire extinguishing device comprises:

a cylindrical enclosure for storing therein said fire extinguishing agent;

first and second storage tank attachment members coupled to a side of said cabinet wherein said first and second storage tank attachment members each comprise a circular member fixedly coupled circumferentially around said cylindrical enclosure and a support bar member coupled to said circular member for securing said cylindrical enclosure to the side of said sealed cabinet;

a valve coupled to a bottom side of said cylindrical enclosure and to a path from said control logic circuit;

at least one agent distribution hose coupled to said valve; and, at least one inlet port coupled to said cabinet and to one end of said agent distribution hose.

11. An electrical fire sensing and fire prevention/extinguishing system comprising:

a sealed cabinet, having a cabinet door, for enclosing electrical circuits wherein said electrical circuits have coupled thereto a power supply, said sealed cabinet preventing ambient light from entering said sealed cabinet except when said cabinet door is open;

a spark sensor for detecting flashes or sparks of light within said sealed cabinet, said spark sensor being a photoelectric cell;

a heat sensor for detecting a rise in temperature in said sealed cabinet;

a smoke detector for detecting smoke in said sealed cabinet;

a fire extinguisher device for storing a CO2 fire extinguishing agent;

a control logic circuit having coupled thereto said spark sensor, said heat sensor, said smoke detector, said fire extinguisher device and said power supply wherein in response to said spark sensor detecting a flash or spark of light in said sealed cabinet, said control logic circuit shuts off said power supply and when said heat sensor or said smoke detector detects a rise in temperature or the presence of smoke, respectively said control logic circuit shuts off said power supply and activates said fire extinguishing device; and, a cabinet door switch coupled between said spark sensor and said control logic circuit wherein when said cabinet door is opened said cabinet door switch is opened to open a path from said spark sensor to said control logic circuit.

12. The system of claim 11, further comprising at least one alarm wherein when said control logic circuit shuts off said power supply, said at least one alarm is activated.

13. The system of claim 11, wherein said spark sensor further detects a flaming fire; and wherein when said flaming fire is detected said control logic shuts off said power supply and activates said fire extinguishing device.

14. The system of claim 11, wherein said fire extinguishing device comprises:

a cylindrical enclosure for storing therein said CO2 fire extinguishing agent;

first and second storage tank attachment members coupled to a side of said cabinet wherein said first and second storage tank attachment members each comprise a circular member fixedly coupled circumferentially around said cylindrical enclosure and a support bar member coupled to said circular member for securing said cylindrical enclosure to the side of said sealed cabinet;

a valve coupled to a bottom side of said cylindrical enclosure and to a path from said control logic circuit;

at least one agent distribution hose coupled to said valve; and, at least one inlet port coupled to said cabinet and to one end of said agent distribution hose.

* * * * *